(12) United States Patent
Asakura

(10) Patent No.: US 12,052,774 B2
(45) Date of Patent: *Jul. 30, 2024

(54) COMMUNICATION SYSTEM, NON-TRANSITORY COMPUTER-READABLE MEDIUM FOR TERMINAL, AND COMMUNICATION APPARATUS FOR ENABLING A WIRELESS CONNECTION BETWEEN A PAIR OF APPARATUSES

(71) Applicant: BROTHER KOGYO KABUSHIKI KAISHA, Nagoya (JP)

(72) Inventor: Hirotaka Asakura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 268 days.

This patent is subject to a terminal disclaimer.

(21) Appl. No.: 17/679,181

(22) Filed: Feb. 24, 2022

(65) Prior Publication Data
US 2022/0279606 A1  Sep. 1, 2022

(30) Foreign Application Priority Data
Feb. 26, 2021  (JP) .................. 2021-029846

(51) Int. Cl.
*H04W 76/10* (2018.01)
*H04W 24/02* (2009.01)
*H04W 84/12* (2009.01)

(52) U.S. Cl.
CPC .......... *H04W 76/10* (2018.02); *H04W 24/02* (2013.01); *H04W 84/12* (2013.01)

(58) Field of Classification Search
CPC ..... H04W 76/10; H04W 24/02; H04W 84/12; H04W 8/005; H04W 12/50; H04W 48/16;
(Continued)

(56) References Cited

U.S. PATENT DOCUMENTS 11,134,529 B2 * 9/2021 Takeuchi .............. H04W 76/14
2012/0110065 A1 * 5/2012 Oshima ................. G06F 3/1265
709/203

(Continued)

FOREIGN PATENT DOCUMENTS

JP  2014-116871 A  6/2014
JP  2014116871  *  6/2014
(Continued)

OTHER PUBLICATIONS

Wi-Fi Easy Connect Specification Version 2.0, Wi-Fi Alliance, 2020, pp. 1-226.

*Primary Examiner* — Angelica Perez
(74) *Attorney, Agent, or Firm* — Scully, Scott, Murphy & Presser, PC

(57) ABSTRACT

A first terminal obtains a character string by decoding a code image. The character string is described in accordance with Bootstrapping Information Format and includes a public key of a communication apparatus and specific information. The first terminal displays an operation screen by using the specific information. The first terminal executes a first target communication with the communication apparatus by using the public key after a changing operation indicated by the operation screen is performed to the communication apparatus. A second terminal obtains the character string by decoding the code image. The second terminal executes a second target communication with the communication apparatus by using the public key after the changing operation is performed to the communication apparatus without displaying the operation screen using the specific information.

23 Claims, 6 Drawing Sheets

(58) Field of Classification Search
CPC ..... H04W 16/225; H04W 4/80; H04W 12/04; H04W 76/14; H04W 76/18; H04W 4/50; H04L 63/0442; H03M 13/6527; H03M 2215/2033
See application file for complete search history.

(56) References Cited

U.S. PATENT DOCUMENTS

| | | | | |
|---|---|---|---|---|
| 2013/0326069 | A1* | 12/2013 | Wang | H04W 24/02 709/227 |
| 2017/0127278 | A1* | 5/2017 | Yamamoto | H04M 1/724631 |
| 2017/0280488 | A1* | 9/2017 | Kawasaki | H04L 61/5007 |
| 2020/0154276 | A1* | 5/2020 | Minakawa | H04W 76/10 |
| 2021/0067953 | A1* | 3/2021 | Miyake | H04W 4/80 |

FOREIGN PATENT DOCUMENTS

| | | | |
|---|---|---|---|
| JP | 2019-013034 A | | 1/2019 |
| JP | 2019013034 | * | 1/2019 |
| JP | 2019-029989 A | | 2/2019 |

* cited by examiner

COMMUNICATION SYSTEM 2

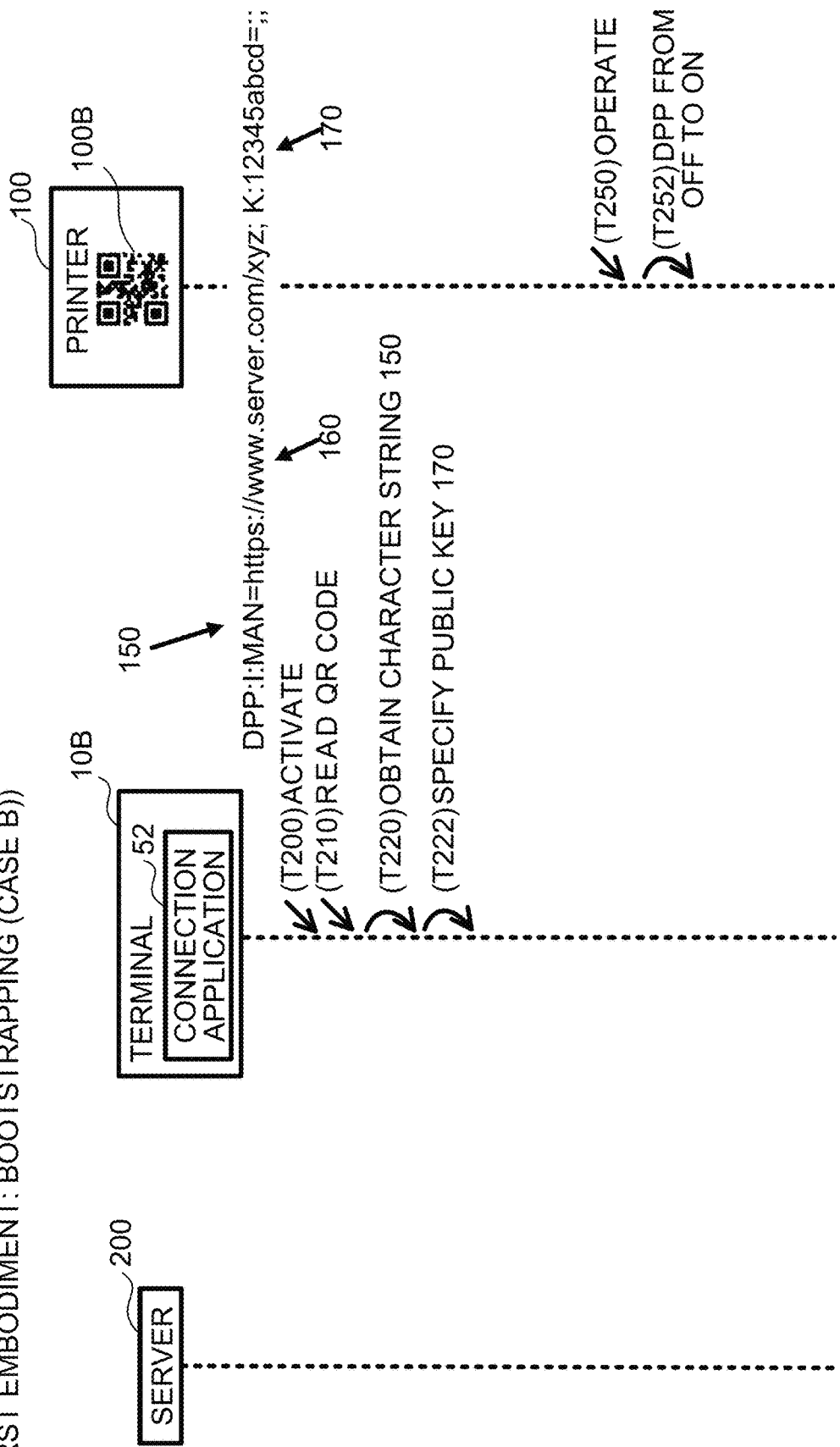

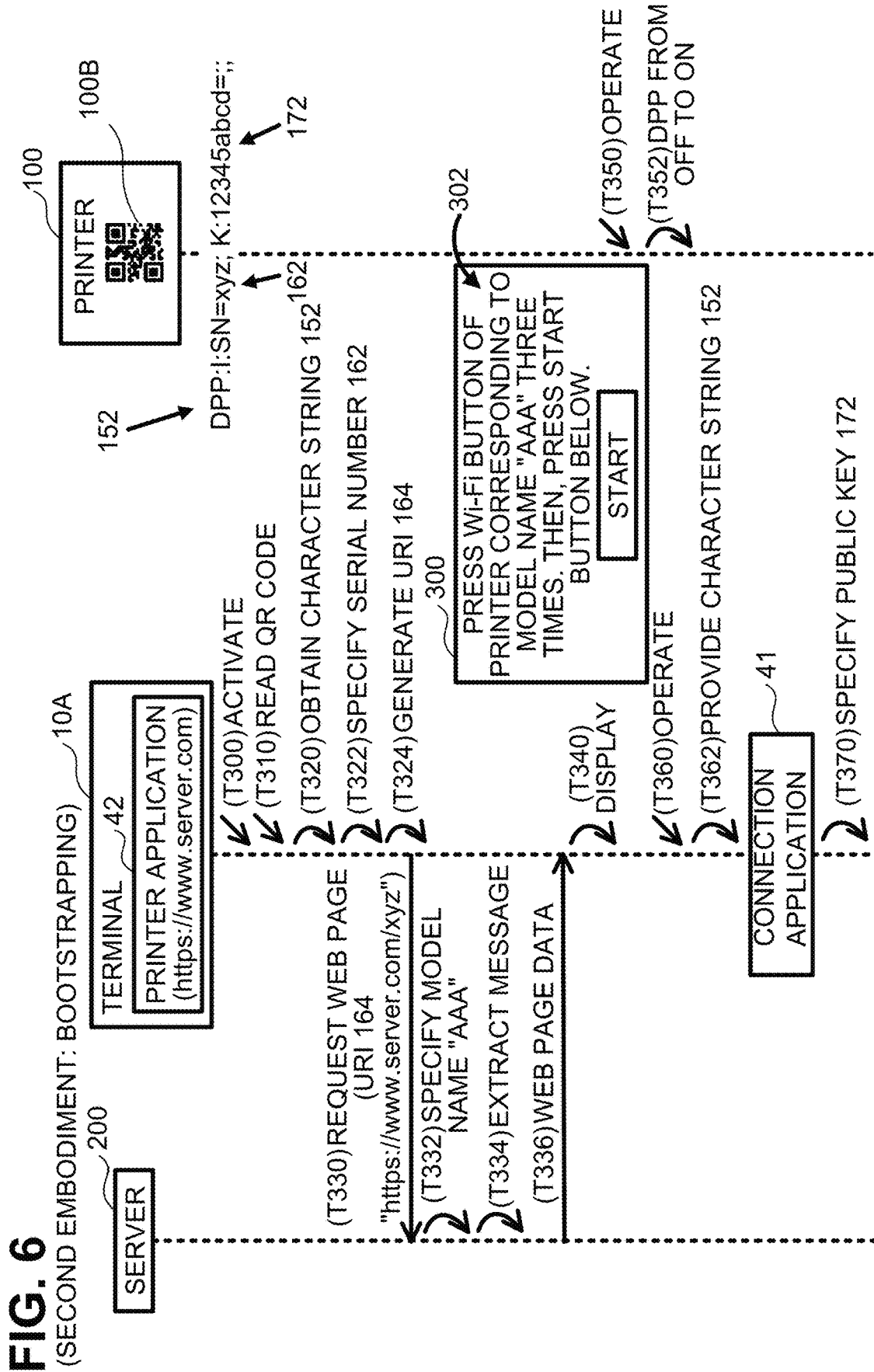

COMMUNICATION SYSTEM, NON-TRANSITORY COMPUTER-READABLE MEDIUM FOR TERMINAL, AND COMMUNICATION APPARATUS FOR ENABLING A WIRELESS CONNECTION BETWEEN A PAIR OF APPARATUSES

CROSS-REFERENCE TO RELATED APPLICATION

This application claims priority from Japanese Patent Application No. 2021-029846 filed on Feb. 26, 2021, the content of which is incorporated herein by reference in its entirety.

TECHNICAL FIELD

Aspects disclosed herein relate to a technique for establishing a wireless connection between a pair of apparatuses in accordance with a Device Provisioning Protocol scheme (hereinafter referred to as a "DPP scheme").

BACKGROUND

A DPP scheme that is a wireless communication scheme defined by Wi-Fi Alliance is known. The DPP scheme is for establishing a wireless connection according to Wi-Fi (Registered Trademark, Wi-Fi Alliance) standard between a pair of apparatuses.

SUMMARY

Aspects of the disclosure provide a technique that enables establishment of a wireless connection between a pair of apparatuses using the terminal easily according to the DPP scheme of the Wi-Fi standard.

In an aspect of the disclosure, a communication system may include a communication apparatus, a first terminal, and a second terminal. The first terminal includes: a first camera; a first wireless interface configured to execute a wireless communication according to Device Provisioning Protocol (DPP) scheme of Wi-Fi standard; a display; a first computer; a first memory configured to store a first computer program that is provided by a vendor of the communication apparatus, wherein the first computer program, when executed by the first computer, causes the first terminal to: obtain a character string by decoding a code image in response to the first camera reading the code image, the character string being described in accordance with Bootstrapping Information Format and including a public key of the communication apparatus and specific information, the specific information being used for displaying an operation screen for the communication apparatus; execute a display process by using the specific information in the character string, the display process being for displaying the operation screen on the display, the operation screen indicating a changing operation for changing a state of the communication apparatus from a first state in which the wireless communication according to the DPP scheme is not to be executed to a second state in which the wireless communication according to the DPP scheme is to be executed; and execute a specific process after the character string is obtained, the specific process being for enabling a first target communication via the first wireless interface with the communication apparatus according to the DPP scheme, the first target communication being for enabling a pair of apparatuses to establish a wireless connection therebetween according to the DPP scheme, and the first target communication being executed using the public key included in the character string after the state of the communication apparatus is changed from the first state to the second state due to the changing operation, wherein the second terminal comprises: a second camera; a second wireless interface configured to execute the wireless communication according to the DPP scheme; a second computer; and a second memory configured not to store the first computer program but to store a second computer program, the second computer program being not provided by the vendor of the communication apparatus, wherein the second computer program, when executed by the second computer, causes the second terminal to: obtain the character string by decoding the code image in response to the second camera reading the code image, the character string being described in accordance with Bootstrapping Information Format and including the public key of the communication apparatus and specific information, the specific information being used for displaying the operation screen for the communication apparatus; and execute, without executing the display process, the specific process after the character string is obtained, the specific process being for enabling a second target communication via the second wireless interface with the communication apparatus according to the DPP scheme, the second target communication being for enabling a pair of apparatuses to establish a wireless connection therebetween according to the DPP scheme, and the second target communication being executed using the public key included in the character string after the state of the communication apparatus is changed from the first state to the second state due to the changing operation.

According to the above configuration, a user of the first terminal may perform the changing operation to the communication apparatus easily in accordance with the operation screen. That is, the first terminal may provide the user of the first terminal with the operation screen that enables the user to perform the changing operation to the communication apparatus easily. Thus, the user may establish a wireless connection easily according to the DPP scheme between the pair of apparatuses using the first terminal. In addition, according to the above configuration, the character string obtained from the code image is described in accordance with the Bootstrapping Information Format. Accordingly, the second terminal that does not include the first computer program may also use the public key included in the character string. Thus, the user may establish a wireless connection easily according to the DPP scheme between the pair of apparatuses using the second terminal.

Another aspect of the disclosure is a non-transitory computer readable recording medium for storing a first computer program for a terminal. The terminal includes: a camera; a wireless interface configured to execute a wireless communication according to Device Provisioning Protocol (DPP) scheme of Wi-Fi standard; a display; and a computer. The first computer program, when executed by the computer, causes the terminal to: obtain a character string by decoding a code image in response to the camera reading the code image, the character string being described in accordance with Bootstrapping Information Format and including a public key of a communication apparatus and specific information, the specific information being used for displaying an operation screen for the communication apparatus; execute a display process by using the specific information in the character string, the display process being for displaying the operation screen on the display, the operation screen indicating a changing operation for changing a state of the communication apparatus from a first state in which a wireless communication according to the DPP scheme is not to be executed to a second state in which the wireless communication according to the DPP scheme is to be executed; and execute a specific process after the character string is obtained, the specific process being for enabling a first target communication via the wireless interface with the communication apparatus according to the DPP scheme, the first target communication being for enabling a pair of apparatuses to establish a wireless connection therebetween according to the DPP scheme, and the first target communication being executed using the public key included in the character string after the state of the communication apparatus is changed from the first state to the second state due to the changing operation.

According to the above configuration, a user of the terminal may perform the changing operation to the communication apparatus easily in accordance with the operation screen. That is, the terminal may provide the user of the terminal with the operation screen that enables the user to perform the changing operation to the communication apparatus easily. Thus, the user may establish a wireless connection easily according to the DPP scheme between the pair of apparatuses using the terminal.

Another aspect of the disclosure is a communication apparatus including: a wireless interface configured to execute a wireless communication according to Device Provisioning Protocol (DPP) scheme of Wi-Fi standard; a housing to which a seal is attached, the seal including a code image that is generated by encoding a character string, the character string being described in accordance with Bootstrapping Information Format and including a public key of the communication apparatus and specific information, the specific information being used for enabling a first terminal to execute a display process for displaying an operation screen of the communication apparatus, the display process being executed by a first computer program of the first terminal provided by a vender of the communication apparatus, the operation screen indicating a changing operation for changing a state of the communication apparatus from a first state in which a wireless communication according to the DPP scheme is not to be executed to a second state in which the wireless communication according to the DPP scheme is to be executed; and a controller configured to: receiving the changing operation for changing the state of the communication apparatus from the first state to the second state; in a case where the changing operation is received in response to displaying the operation screen at the first terminal, execute a first target communication via the wireless interface with the first terminal according to the DPP scheme in response to the first terminal using the public key included in the character string, the first target communication being for enabling a pair of apparatuses to establish a wireless connection therebetween according to the DPP scheme; and in a case where the changing operation is received without displaying the operation screen at a second terminal that stores a second computer program not provided by the vender, execute a second target communication via the wireless interface with the second terminal according to the DPP scheme in response to the second computer program using the public key included in the character string, the second target communication being for enabling a pair of apparatuses to establish a wireless connection therebetween according to the DPP scheme.

According to the above configuration, a user of the first terminal may perform the changing operation to the communication apparatus easily in accordance with the operation screen. That is, the first terminal may provide the user of the first terminal with the operation screen that enables the user to perform the changing operation to the communication apparatus easily. Thus, the user may establish a wireless connection easily according to the DPP scheme between the pair of apparatuses using the first terminal. In addition, according to the above configuration, the character string obtained from the code image is described in accordance with the Bootstrapping Information Format. Accordingly, the second terminal including the second computer program that is not provided by a vendor of the communication apparatus may also use the public key included in the character string. Thus, the user may establish a wireless connection easily according to the DPP scheme between the pair of apparatuses using the second terminal.

The terminal and the method performed by the terminal are also novel and useful. A non-transitory computer-readable recording medium storing the first computer program for the terminal is also novel and useful. Further, a method executed by the communication apparatus, a computer program for realizing operations of the communication apparatus, and a computer-readable recording medium storing the computer program are also novel and useful.

BRIEF DESCRIPTION OF THE DRAWINGS

FIG. 5 illustrates a sequence diagram of Bootstrapping of case B according to the first embodiment.

FIG. 6 illustrates a sequence diagram of Bootstrapping according to the second embodiment.

DETAILED DESCRIPTION

Figure 1:
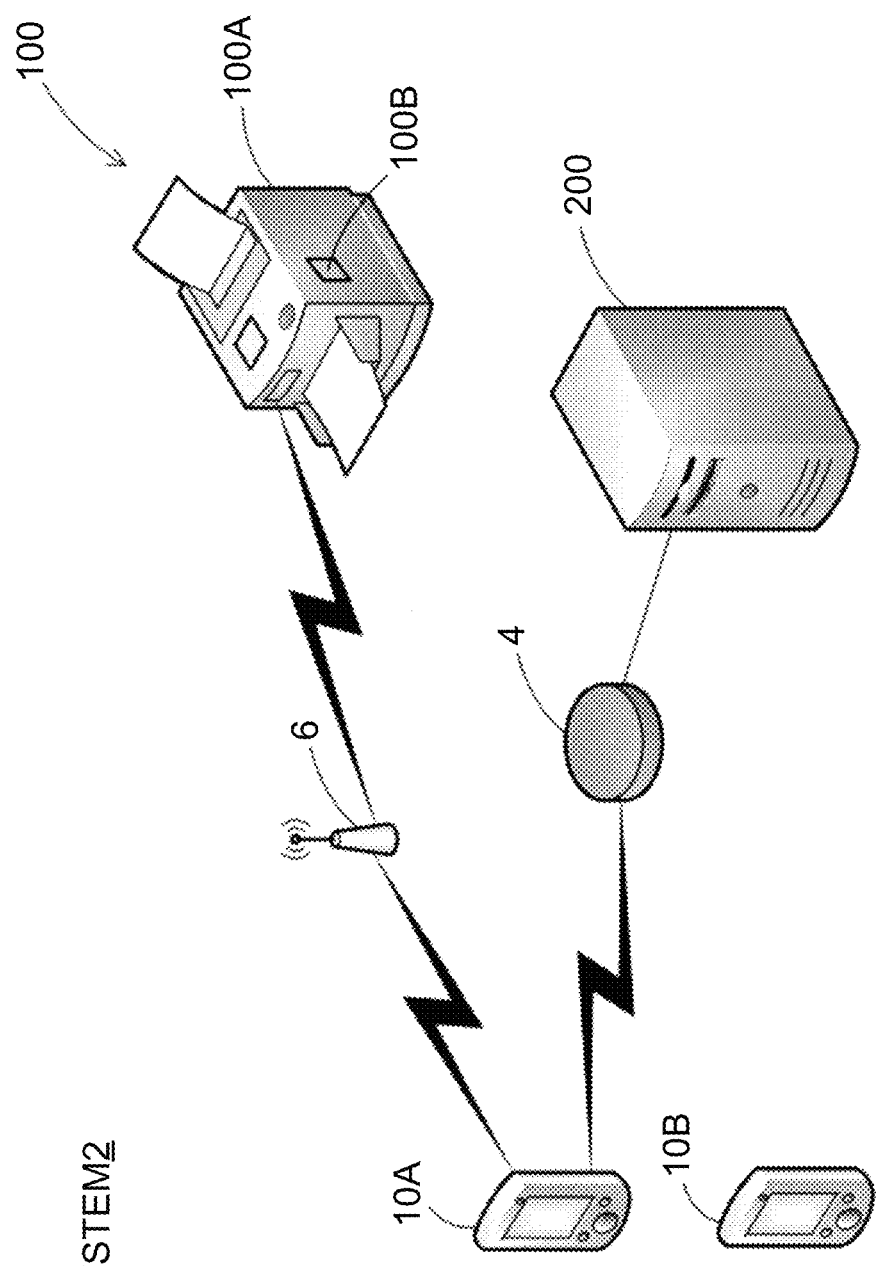
FIG. 1 illustrates a schematic configuration of a communication system.

First Embodiment (Configuration of Communication System 2; FIG. 1)

As illustrated in FIG. 1, the communication system 2 includes an access point (hereinafter, referred to as "AP") 6, a plurality of terminals 10A and 10B, a printer 100, and a server 200. In this embodiment, a situation is assumed in which a user uses one of the terminals 10A and 10B to establish a wireless connection (hereinafter referred to as a "Wi-Fi connection") according to the Wi-Fi standard between the printer 100 and the AP 6.

Figure 2:
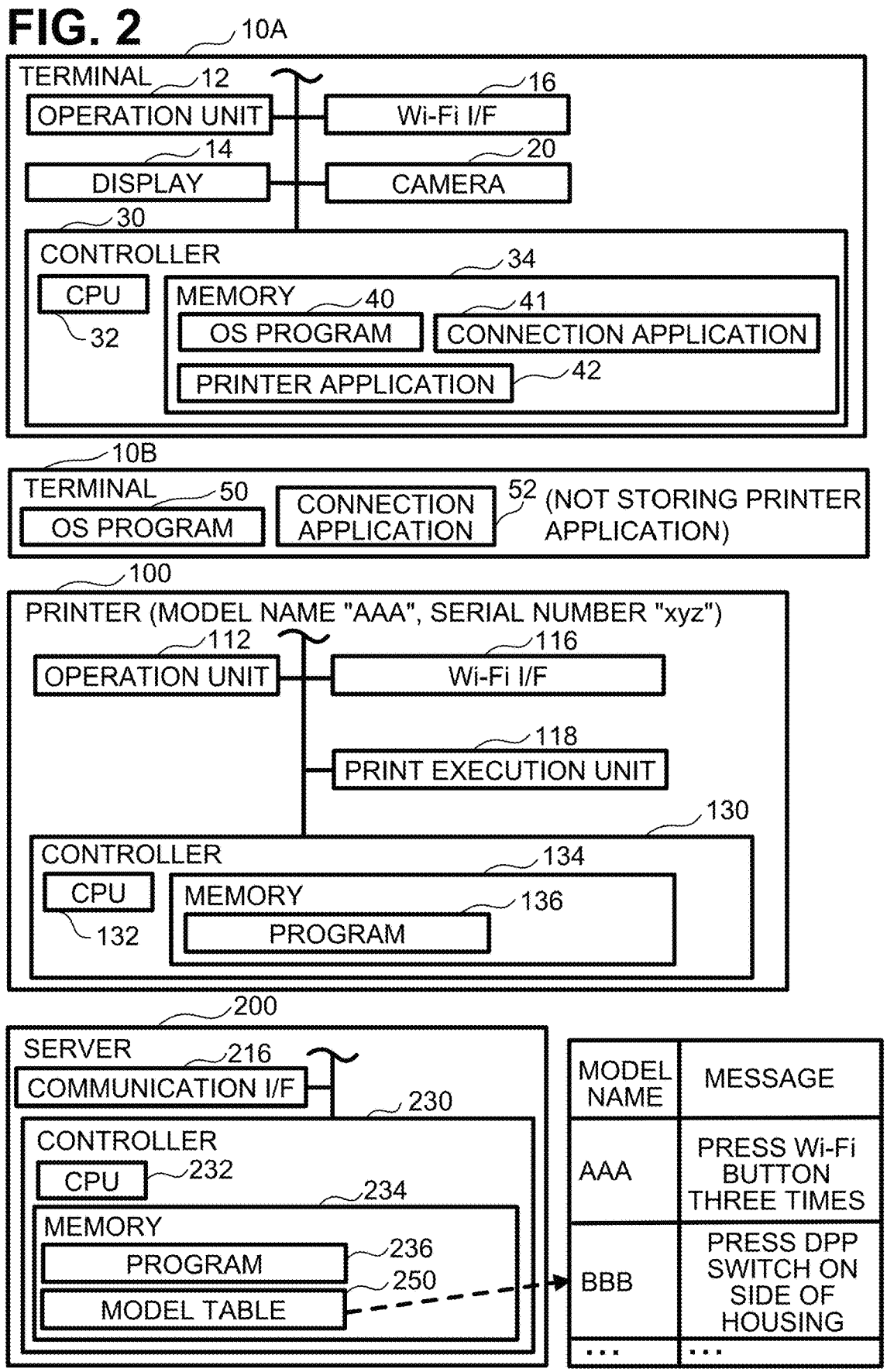
FIG. 2 illustrates a control configuration of each apparatus.

(Configuration of Terminal 10A; FIG. 2)

The terminal 10A is a portable terminal such as a mobile phone (e.g., a smartphone), a PDA, or a tablet PC. In a modification, the terminal 10A may be a stationary terminal. As illustrated in FIG. 2, the terminal 10A includes an operation unit 12, a display 14, a Wi-Fi interface 16, a camera 20, and a controller 30. Each unit 12 to 30 is connected to a bus (reference numeral omitted). Hereinafter, the interface is referred to as an "I/F".

The operation unit 12 includes a plurality of buttons. The user may operate the operation unit 12 to input various instructions into the terminal 10A. The display 14 is for displaying various items of information. The display 14 includes a touchscreen function (i.e., an operation unit). The camera 20 is for reading an image of an object. In this embodiment, the camera 20 is used to read a QR Code (Registered Trademark, Denso Wave Incorporated Corporation) in association with the printer 100.

The Wi-Fi I/F 16 is a wireless interface for performing wireless communication in accordance with the Wi-Fi standard. The Wi-Fi standard is for performing wireless communication in accordance with a standard such as the 802.11 standard of Institute of Electrical and Electronics Engineers, Inc. (IEEE) and similar specifications modeled after IEEE 802.11 (e.g., 802.11a, 11b, 11g, 11n). The terminal 10A may establish a Wi-Fi connection with AP 6 through Wi-Fi I/F 16 by using an SSID and a password of a wireless network formed by AP 6.

The Wi-Fi I/F 16 supports the DPP scheme established by Wi-Fi Alliance. The DPP scheme is described in a standard document of "Wi-Fi Easy Connect Specification Version 2.0" created by the Wi-Fi Alliance, and is for easily establishing a Wi-Fi connection between a pair of apparatuses (e.g., the printer 100 and the AP 6) using a terminal 10A. Hereinafter, this standard document is referred to as "DPP standard document".

The controller 30 includes a CPU 32 and a memory 34. The CPU 32 executes various processing in accordance with each program 40, 41, and 42 stored in the memory 34. The memory 34 is a memory such as a volatile memory and a nonvolatile memory. The memory 34 stores an OS program 40, a connection application 41, and a printer application 42. Hereinafter, the OS program 40 is referred to as "OS 40".

The OS 40 is a program for causing basic operations of the terminal 10A. In this embodiment, the OS 40 is Android (Registered trademark, Google, Inc). In modification, the OS 40 may be another OS (e.g., iOS (Registered Trademark, Cisco systems, Inc)). The OS 40 is prestored in the terminal 10 at the shipment of the terminal 10A.

The connection application 41 is a program for causing a wireless communication according to the DPP scheme to establish a Wi-Fi connection between the printer 100 and the AP 6. The connection application 41 is a standard application used together with the OS 40. The connection application 41 is stored in advance in the terminal 10A before shipment of the terminal 10A. That is, the connection application 41 is a program that is not provided by the vendor of the printer 100. In a modification, the terminal 10A may include a universal application instead of the connection application 41.

The printer application 42 is a program for causing the connection application 41 to execute a wireless communication in accordance with the DPP scheme. The printer application 42 is a program for causing the printer 100 to execute printing. The printer application 42 is a program provided by the vendor of the printer 100. The printer application 42 is installed in the terminal 10A after the shipment of the terminal 10A.

(Configuration of Terminal 10B; FIG. 2)

The terminal 10B basically has the same configuration as that of the terminal 10A. That is, the terminal 10B includes an operation unit, a display, a Wi-Fi I/F, a camera, and a controller including a CPU and a memory (not shown in figures). The memory of the terminal 10B stores an OS 50 and a connection application 52, and does not store the printer application 42. The connection application 52 is the same application as the connection application 41 in the terminal 10A. The connection application 52 is prestored in the terminal 10B at the shipment of the terminal 10B.

(Configuration of Printer 100; FIGS. 1 and 2)

The printer 100 is a peripheral device (e.g., a peripheral device of terminals 10A and 10B) configured to perform printing. The printer 100 has a model name "AAA" and a serial number "xyz". As illustrated in FIG. 1, the printer 100 includes a housing 100A. The housing 100A has a seal 100B indicating a QR Code attached thereto. The QR Code is information obtained by encoding a character string including a Uniform Resource Identifier (URI) and a public key of the printer 100. The URI includes a domain of the server 200 and the serial number "xyz" of the printer 100.

As illustrated in FIG. 2, the printer 100 includes an operation unit 112, a Wi-Fi I/F 116, a print execution unit 118, and a controller 130. Each unit 112 to 130 is connected to a bus line (reference numeral omitted). The printer 100 is not configured to display a QR Code. This means that the printer 100 does not have any display or that the printer 100 has a very small display.

The operation unit 112 includes a plurality of buttons. The user may input various instructions to the printer 100 using the operation unit 112. The Wi-Fi I/F 116 supports the DPP scheme. The print execution unit 118 includes a print mechanism such as an inkjet system or a laser system. The controller 130 includes a CPU 132 and a memory 134. The CPU 132 executes various processing in accordance with a program 136 stored in the memory 134. The memory 134 is a memory such as a volatile memory and a nonvolatile memory.

(Configuration of Server 200; FIG. 2)

The server 200 is a web server, and is disposed on the Internet 4 (illustrated in FIG. 1) by a vendor of the printer 100. The server 200 includes a communication I/F 216 and a controller 230. Each unit 216 and 230 is connected to a bus (reference numeral omitted). The communication I/F 216 is connected to the Internet 4. The controller 230 includes a CPU 232 and a memory 234. The CPU 132 executes various processing in accordance with a program 236 stored in the memory 234. The memory 234 is a memory such as a volatile memory and a nonvolatile memory.

The memory 234 further stores a model table 250. In the model table 250, for each of a plurality of model names of a printer, the model name is associated with a message indicating a changing operation. The changing operation is for changing the state of the printer having the model name from an OFF state to an ON state. The OFF state is a state in which a wireless communication according to the DPP scheme is not to be executed. The ON state is a state in which the wireless communication according to the DPP scheme is to be executed.

Figure 3:
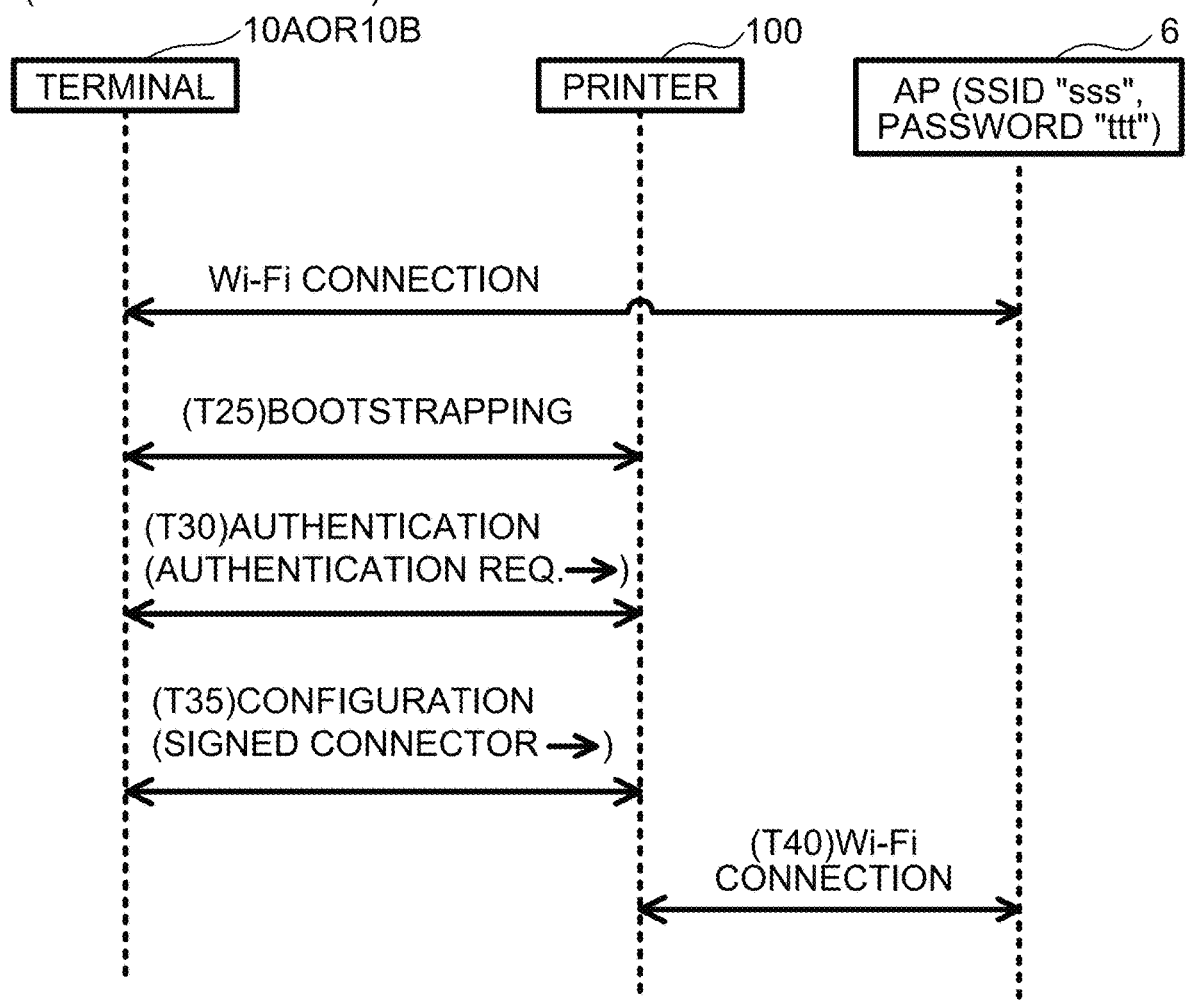
FIG. 3 illustrates a schematic sequence diagram of processes for establishing a Wi-Fi connection between a printer and an access point.

(Overview of DPP; FIG. 3)

Hereinafter, an overview of the DPP will be described with reference to FIG. 3. In the following, for ease of understanding, an operation executed by a CPU (e.g., a CPU 32) of each apparatus is mainly described by each apparatus (e.g., a terminal 10A) without being mainly described by the CPU. In addition, each of the terminal 10A and the terminal 10B executes the same processing in FIG. 3. Thus, in FIG. 3, the terminal 10A and the terminal 10B are collectively referred to as "terminal 10". The following communications are executed by using I/F 16, 116, and 216 (illustrated in FIG. 2). Thus, the description of "via I/F" is omitted.

In this embodiment, the AP 6 does not support the DPP scheme. The AP 6 operates as a parent station of the wireless network in which an SSID of "sss" and a password of "ttt" are used. For example, the user of the terminal 10 inputs the SSID of "sss" and the password of "ttt" to the terminal 10 by operating the operation unit 12. In response to this operation, the terminal 10 establishes a Wi-Fi connection with the AP 6 in accordance with the OS 40. The terminal 10 may communicate with the printer 100 via the AP 6 to cause the printer 100 to execute printing after the printer 100 has established a Wi-Fi connection with the AP 6. This is achieved by the processing described below.

In T25, the terminal 10 executes Bootstrapping (hereinafter, referred to as "BS") with the printer 100. The BS is described in the DPP standard document. The BS is a process in which the printer 100 provides the terminal 10 with a public key in response to the terminal 10 reading a QR Code indicated in a seal 100B (as illustrated in FIG. 1) attached to the printer 100. The public key is used in an Authentication (hereinafter referred to as "Auth") described in the DPP standard document.

In T30, the terminal 10 executes Auth with the printer 100 using the public key obtained through the BS in T25. Auth is a process for each of the terminal 10 and the printer 100 to authenticate a communication partner. Specifically, the terminal 10 transmits an Auth request using the public key to the printer 100, and receives an Auth response from the printer 100.

In T35, the terminal 10 executes Configuration (hereinafter referred to as "Config") with the printer 100. The Config is described in the DPP standard document. The Config is a process of transmitting, to the printer 100, information for establishing a Wi-Fi connection between the printer 100 and the AP 6. Specifically, the terminal 10 generates a Signed Connector (hereinafter referred to as "SC") and transmits the SC to the printer 100. The SC includes the SSID of "sss" of AP 6 and the password of "ttt" of AP 6.

In T40, the printer 100 establishes a Wi-Fi connection with AP 6 using the SSID of "sss" and the password of "ttt" included in the SC obtained in T35. Specifically, the printer 100 transmits a Probe request by broadcast. Then, the printer 100 receives a Probe response from each of one or more APs around the printer 100 including the AP 6. In this case, the printer 100 determines that received one or more Probe responses include a Probe response including the SSID of "sss" that is the same SSID included in the received SC. Then, the printer 100 executes various communications such as an Association and a 4way-handshake with the AP 6, thereby establishing a Wi-Fi connection with the AP 6. In the process of the various communications, the printer 100 transmits authentication information using the password of "ttt" included in the received SC to the AP 6, and the AP 6 performs authentication of the password of "ttt". In response to a success of the authentication, a Wi-Fi connection is established between the printer 100 and the AP 6.

As a result of the processes illustrated in FIG. 3, both of the terminal 10 and the printer 100 belongs to the same wireless network formed by AP 6 as a child station. Accordingly, the terminal 10 may transmit print data to the printer 100 via the AP 6. Then, the printer 100 can print an image represented by the print data.

In the DPP scheme, input of the SSID of "sss" of the AP 6 and the password of "ttt" of the AP 6 to the printer 100 in order to establish the Wi-Fi connection between the printer 100 and the AP 6 may be omitted. Thus, the Wi-Fi connection between the printer 100 and the AP 6 may be established easily.

Figure 4:
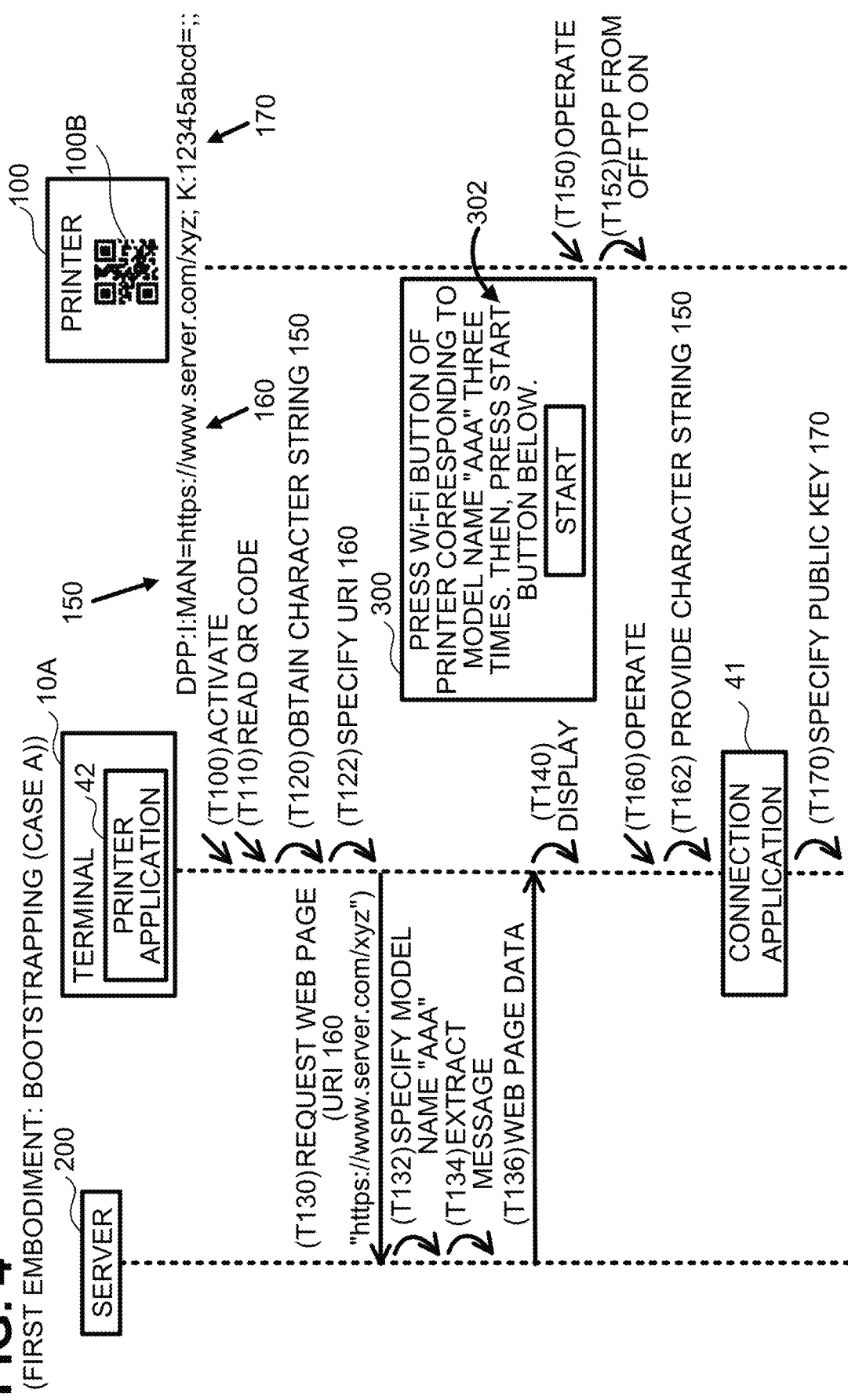
FIG. 4 illustrates a sequence diagram of Bootstrapping of case A according to the first embodiment.

(Details of BS; FIGS. 4 and 5)

Referring to FIGS. 4 and 5, the BS in the T25 of FIG. 3 will be described in detail. FIG. 4 illustrates the BS of the case A executed by the terminal 10A having the printer application 42. FIG. 5 illustrates the BS of the case B executed by the terminal 10B not having the printer application 42.

(Case A; FIG. 4)

The QR Code represented by the seal 100B of the printer 100 is a coded character string 150. The character string 150 is described in accordance with the Bootstrapping Information Format described in the DPP standard document. Specifically, the character string 150 includes an identifier "K" according to an Augmented Backus Naur Form (ABNF) rule, a character string "12345abcd" described in association with the identifier "K", an identifier "I" according to the ABNF rule, and a character string "MAN=https://www-.server.com/xyz" described in association with the identifier "I". In this embodiment, "a character string described in association with an identifier" means a character string described after the identifier.

The identifier of "K" indicates that the character string of "12345abcd" associated with the identifier "K" is the public key of the printer 100. The connection applications 41 and 52, which are programs supporting the DPP scheme, may recognize that the character string specified by the identifier of "K" is a public key. Thus, the connection applications 41 and 52 may appropriately specify the public key of the printer 100.

The identifier "I" indicates that the character string of "MAN=https://www.server.com/xyz" associated with the identifier "I" is information described by the vendor of the printer 100 arbitrarily. In this embodiment, the information corresponds to "MAN" that indicates a manual (i.e., an operation screen) in the server 200 and "https://www.server-.com/xyz" that is a URI of the manual. The URI includes "xyz" that is the serial number of the printer 100. The printer application 42, which is a program provided by the vendor of the printer 100, may recognize that the character string specified by the identifier of "I" is a URI and that the URI includes the serial number of the printer 100. The connection applications 41 and 52, which are programs that are not provided by the vendor of the printer 100, may not recognize that the character string specified by the identifier of "I" is the URI of the server 200. In other words, the character string specified by the identifier of "I" is configured such that the printer application 42 may recognize that the character string is the URI of the server 200 and the connection applications 41 and 52 may not recognize that the character string is the URI of the server 200. Thus, the printer application 42 may appropriately specify the URI of the server 200.

In T100, the terminal 10A receives an operation to activate the printer application 42 from the user. The terminal 10A executes the following processing in accordance with the printer application 42. In T110, in response to receiving, from the user, an operation of reading the QR Code indicated by the seal 100B, the terminal 10A reads the QR Code with the camera 20. In T120, the terminal 10A obtains the character string 150 by decoding the QR Code. In T122, the terminal 10A specifies the URI 160 of "https://www.server-.com/xyz" specified by the identifier of "I" from the character string 150.

In T130, the terminal 10A transmits, to the web server 200, a web page request including URI 160 that is a transmission destination. Although the terminal 10A includes a browser program (not shown in figures), the terminal 10A transmits the web page request and displays a web page using the printer application 42 without using the browser program. According to this configuration, the terminal 10A does not need to activate the browser program. In other words, the terminal 10A does not need to display a window displayed by the browser program that is different from the window displayed by the printer application 42. Thus, the processing load on the terminal 10A may reduce, and the user does not need to view a plurality of windows.

In response to receiving the web page request from the terminal 10A in T130, in T132, the server 200 specifies the serial number of "xyz" included in the URI 160 of the web page request. The server 200 stores a serial number table (not shown in figures). The table includes, for each of a plurality of printers, a serial number of the printer and a model name of the printer in association with each other. Thus, in T132, the server 200 may identify the model name of "AAA" of the printer 100 from the serial number of "xyz" by using the table. In modification, the serial number of "xyz" may include a character string indicating the model name of "AAA". In this modification, the server 200 may specify the model name of "AAA" from the serial number "xyz" without using the serial number table.

In T134, the server 200 extracts a message of "Press the Wi-Fi button three times" corresponding to the model name "AAA" specified in T132 from the model table 250 (illustrated in FIG. 2) in the memory 234. Next, the server 200 generates web page data representing a web page. The web page includes a message 302 including the extracted message and a predetermined message, and a start button. The predetermined message indicates that the start button needs to be pressed after the operation according to the extracted message is performed. The start button is a button for causing the terminal 10A to start Auth. Then, in T136, the server 200 transmits the generated web page data to the terminal 10A.

In response to receiving the web page data from the server 200 in T136, in T140, the terminal 10A displays the Web page 300 represented by the Web page data on the display 14. The web page 300 includes the message 302 and a start button.

In T150, the printer 100 determines that the user has been pressed the Wi-Fi button included in the operation unit 112 of the printer 100 based on the message 302 in the web page 300. In response to this determination, in T152, the printer 100 shifts the status of the printer 100 from the OFF state to the ON state. More specifically, the printer 100 (i.e., CPU 132) provides, to the Wi-Fi I/F 116, an instruction of switching from the OFF state to the ON state. Accordingly, the printer 100 is enabled to communicate according to the DPP scheme (e.g., to receive an Auth request or to transmit an Auth response). That is, the web page 300 is an operation screen displaying a changing operation for changing the state of the printer 100 from the OFF state to the ON state.

According to this embodiment, the web page 300 includes the message 302 for changing the state of the printer 100 indicated by the model name of "AAA" to the ON state. Thus, the printer 100 may change the state of the printer 100 to the ON state easily in response to the user's operation. If the printer 100 maintains the state of the printer 100 in the OFF state, the printer 100 does not transmit the Auth response to the terminal 10A. In this case, the Auth is not executed, and the printer 100 does not establish the Wi-Fi connection with the AP 6.

In T160, the terminal 10A receives a user's operation of selecting the start button in the web page 300. In response to the user's operation, in T162, the terminal 10A (i.e., the printer application 42) provides the character string 150 specified in T120 to the connection application 41.

In T170, the terminal 10A (i.e., the connection application 41) specifies the public key 170 indicated by the identifier of "K" from the character string 150. Thereafter, the terminal 10A (i.e., the connection application 41) executes the processing of the steps T30 and T35 of FIG. 3. That is, the terminal 10A transmits an Auth request using the public key 170 specified in T170 to the printer 100. In other words, the terminal 10A does not transmit the Auth request to the printer 100 until the start button is operated. Thus, while the printer 100 is in the OFF state, the transmission of the Auth request from the terminal 10A to the printer 100 is not performed.

As described with reference to FIG. 3, the terminal 10A transmits the Auth request to the printer 100, receives the Auth response from the printer 100 (i.e., T30 of FIG. 3), and transmits the SC to the printer 100 (i.e., T35 of FIG. 3). Thus, the terminal 10A may establish the Wi-Fi connection with the AP 6 (i.e., T40 of FIG. 3).

(Case B; FIG. 5)

Hereinafter, BS in the case B executed by the terminal 10B will be described. In T200, the terminal 10B receives an operation to activate the connection application 52 from the user. Then, the terminal 10B executes the following processing in accordance with the connection application 52. In T210, in response to receiving, from the user, an operation of reading the QR Code indicated by the seal 100B, the terminal 10B reads the QR Code with a camera of the terminal 10B. In T220, the terminal 10B obtains the character string 150 by decoding the QR Code. In T222, the terminal 10B specifies the public key indicated by the identifier of "K" from the character string 150. In case B, the terminal 10B may not specify the URI 160 indicated by the identifier "I".

Accordingly, the terminal 10B does not execute the processing for displaying the web page 300 using the URI 160 (i.e., T130, T136, T140 in FIG. 4). In this embodiment, a situation is assumed in which the user of the terminal 10B knows the operation for changing the state of the printer 100 to the ON state (i.e., pressing the Wi-Fi button three times) in advance. Thus, the user may press the Wi-Fi button three times in T250 without viewing the web page 300. Accordingly, in T252, the printer 100 changes the state of the printer 100 from the OFF state to the ON state.

In response to specifying the public key 170 in T222, the terminal 10B repeatedly transmits the Auth request using the public key 170 to the printer 100 without waiting for the operation from the user (e.g., an operation of pressing a start button in T160 of FIG. 4). After transmitting the Auth request to the printer 100, the terminal 10B receives the Auth response from the printer 100 (i.e., T30 of FIG. 3), and then transmits the SC to the printer 100 (i.e., T35 of FIG. 3). Thus, the terminal 10B may establish the Wi-Fi connection with the AP 6 (i.e., T40 of FIG. 3).

Effects of the Embodiment

According to the above configuration, the user of the terminal 10A may perform changing operation to the printer 100 in accordance with the displayed web page 300. That is, the printer 100 may receive the changing operation from the user in accordance with the web page 300 displayed on the terminal 10A (T40 of FIG. 4). Thus, the printer 100 may establish a Wi-Fi connection with the AP 6 easily according to the DPP scheme using the terminal 10A. In addition, according to the above configuration, the character string 150 obtained from the code image is described in accordance with the Bootstrapping Information Format. Thus, the terminal 10B not storing the printer application 42 may determine the public key 170 included in the character string 150. Thus, the printer 100 may establish a Wi-Fi connection with the AP 6 according to the DPP scheme using the terminal 10B.

The character string 150 indicated by the QR Code is described in accordance with the Bootstrapping Information Format. Thus, the QR Code may pass the authentication test of the Wi-Fi Alliance. Thus, a terminal not storing the printer application 42 may use the QR Code of the printer 100.

(Correspondence Relationship)

The printer 100 is an example of a "communication apparatus". The terminal 10A is an example of a "first terminal". The terminal 10B is an example of a "second terminal". A pair of the printer 100 and the AP 6 is an example of a "pair of apparatuses". The printer application 42 is an example of a "first computer program". The connection application 52 is an example of a "second computer program". The OFF state is an example of a "first state". The ON state is an example of a "second state". The message 302 in the web page 300 is an example of a "specific message". The identifier of "K" is an example of a "first identifier". The identifier of "I" is an example of a "second identifier". The URI 160 is an example of "specific information". The serial number of "xyz" is an example of "identification information".

The processing of T30 in FIG. 3 executed by the terminal 10A is an example of "first target communication". The processing of T35 in FIG. 3 executed by the terminal 10A is an example of "target communication". The Auth request transmitted from the terminal 10A to the printer 100 is an example of each of a "first authentication request" and an "authentication request". The Auth response transmitted from the printer 100 to the terminal 10A is an example of each of a "first authentication response" and an "authentication response". The processing of T30 and T35 in FIG. 3 executed by the terminal 10B is an example of a "second target communication". The Auth request transmitted from the terminal 10B to the printer 100 is an example of a "second authentication request". The Auth response transmitted from the printer 100 to the terminal 10B is an example of a "second authentication response". The SC transmitted from the terminal 10A to the printer 100 is an example of each of "connection information" and "first connection information". The SC transmitted from the terminal 10B to the printer 100 is an example of "second connection information".

Second Embodiment; FIG. 6

Hereinafter, a second embodiment will be described. Description of the configuration common to the first embodiment will be omitted. As illustrated in FIG. 6, a character string 152 indicated by a QR Code in the second embodiment is different from the QR Code of the first embodiment. The character string 152 includes the character string of "12345abcd" described in association with the identifier of "K" that is the same as the character string of the first embodiment, and the character string of "SN=xyz" described in association with the identifier of "I" that is not the same as the character string of the first embodiment. The character string of "SN=xyz" includes a character string of "SN" indicating a serial number and a serial number of "xyz" of the printer 100. The printer application 42, which is a program provided by the vendor of the printer 100, may determine that the character string specified by the identifier of "I" includes the serial number of "xyz". The connection applications 41 and 52 may not determine that the character string specified by the identifier of "I" includes the serial number of "xyz".

In T300, the terminal 10A receives an operation to activate the printer application 42 from the user. In T310, in response to receiving an operation of reading the QR Code indicated by the seal 100B, the terminal 10A reads the QR Code with the camera 20. In T320, the terminal 10A obtains the character string 152 by decoding the QR Code. The terminal 10A in the second embodiment obtains the character string 152 instead of the character string 150 of the first embodiment. In T332, the terminal 10A specifies the serial number 162 of "xyz" indicated by the identifier "I" from the character string 152.

In T324, the terminal 10A generates URI 164 of "https://www.server.com/xyz". The URI 164 includes the domain of the server 200 of "www.server.com" that the printer application 42 can determine due to storing the domain therein in advance, and the serial number "xyz" specified in T322. According to this configuration that the terminal 10A generates the URI 164, the terminal 10A may determine appropriate URI in a situation where a location of the web page in the server 200 may change. That is, in response to notifying the changed position to the printer application 42, the printer application 42 may appropriately generate a URI indicating the changed location.

Steps T330 to T370 are the same as the steps T130 to T170 in FIG. 4. Each process executed by the terminal 10B and the printer 100 is the same as the steps T200 to T252 in FIG. 5. The serial number of "xyz" is an example of "specific information".

Although specific examples of the technology disclosed in the specification have been described in detail above, these are merely examples and do not limit the scope of the claims. The technology described in the claims includes various modifications and changes of the specific examples illustrated above. Modifications are listed below.

(First Modification) The terminal 10 may establish the Wi-Fi connection with the AP 6 according to a wireless communication of DPP scheme, instead of using the SSID of "sss" and the password of "ttt" of the AP 6. In this modification, the AP 6 supports the DPP scheme, and has the QR Code indicating a public key of the AP 6 (e.g., has a seal attached to a housing thereof). The terminal 10 obtains the public key of the AP 6 by reading the QR Code (i.e., by executing BS). Thereafter, the terminal 10 executes Auth and Config with the AP 6. In Config with the AP 6, the terminal 10 generates an SC for AP, and transmits the SC for AP to the AP 6. Then, the terminal 10 and the AP 6 share a connection key by executing Network Access (hereinafter referred to as "NA") using the SC for AP, and establish a Wi-Fi connection using the connection key. Thereafter, the terminal 10 executes BS, Auth, and Config (i.e., the steps T25 to T35 in FIG. 3) with the printer 100. In Config with the printer 100, the terminal 10 generates an SC for printer that does not include the SSID of the AP 6 and the password of the AP 6, and transmits the SC for printer to the printer 100. In this modification, the printer 100 and the AP 6 share the connection key by executing NA using the SC for printer and the SC for AP, and establish the Wi-Fi connection using the connection key. In this modification, the SC for printer is an example of "connection information", "first connection information", and "second connection information".

(Second modification) The Wi-Fi connection may be established between the terminal 10 and the printer 100, instead of between the terminal 10 and the AP 6. In this modification, the terminal 10 executes each processing T25 to T35 in FIG. 3, and transmits the SC for printer to the printer 100 in T35. The terminal 10 and the printer 100 share the connection key by executing NA using the SC for printer, and establish the Wi-Fi connection using the connection key. In this modification, the SC for printer is an example of "connection information", "first connection information", and "second connection information". A pair of the terminal 10 and the printer 100 is an example of a "pair of apparatuses".

(Third modification) The Wi-Fi connection may be established between the printer 100 and the AP 6, instead of between the terminal 10 and the AP 6. In this modification, the terminal 10 executes each processing T25 to T35 in FIG. 3, and receives the SC for terminal from the printer 100 in T35. The terminal 10 and the AP 6 share the connection key by executing NA using the SC for terminal, and establish the Wi-Fi connection using the connection key. In this modification, a pair of the terminal 10 and the AP 6 is an example of a "pair of apparatuses". Further, the "target communication" may include receiving "connection information", "first connection information", or "second connection information" from a communication apparatus. The "first target communication" may include receiving "connection information", "first connection information", or "second connection information" from a communication apparatus. The "second target communication" may include receiving "connection information", "first connection information", or "second connection information" from a communication apparatus.

(Fourth Modification) The "specific information" may be information such as a model name and a MAC address of the printer 100, instead of a URI or a serial number.

(Fifth Modification) The character string 150 indicated by the QR Code may be described in accordance with the Bootstrapping Information Format, and may not be described according to the ABNF rule.

(Sixth Modification) The terminal 10A may not include the connection application 41. In this modification, the printer application 42 specifies the public key 170 in T122 of FIG. 4 and does not execute the step of T162. Then, the printer application 42 executes communication of T30 and T35 in FIG. 3 using the public key 170. In this modification, executing communication of T30 and T35 using the public key 170 is an example of a "specific process".

(Seventh Modification) The web page data that is transmitted from the server 200 to the terminal 10A in T136 of FIG. 4 may include, for example, a character string and an image that constitute the web page 300, instead of the web page 300 itself. In this modification, the printer application 42 generates the web page 300 using the web page data.

(Eighth Modification) The communication system of the second embodiment may not include the server 200. In this modification, the printer application 42 includes the model table 250. Then, instead of T324 to T340 in FIG. 6, the printer application 42 specifies a message corresponding to the serial number 162 from the model table 250, and displays an operation screen including the message. In this modification, a process in which the printer application 42 specifies a message from the model table 250 and displays an operation screen is an example of a "display process". In general, the "display process" may not include sending a web page request to the server and displaying a web page received from the server.

(Ninth Modification) The printer application 42 may provide the URI 160 specified at T122 of FIG. 4 to the browser program. In this modification, the browser program can execute processing of T130, T136, and T140. The process in which the printer application 42 provides URI 160 to the browser program is an example of the "display process".

(Tenth Modification) The "communication apparatus" may be another device such as a scanner, a multi-function device, a mobile terminal, a PC, or a server, instead of the printer 100.

In the above-described embodiment, each process in FIGS. 3 to 6 is realized by software, but at least one of these processes may be performed using hardware, such as a logic circuit.

The technical elements described in this specification or the drawings each produce the technical effects separately or in various combinations, and are not limited to the combinations described in the claims as filed. In addition, the techniques illustrated in the specification and the drawings may achieve a plurality of objects at a time. Achieving one of the purposes may produce technical effects.

What is claimed is:
1. A communication system comprising:
a communication apparatus;
a first terminal;
a second terminal,
wherein the first terminal comprises:
  a first camera;
  a first wireless interface configured to execute a wireless communication according to Device Provisioning Protocol (DPP) scheme of Wi-Fi standard;
  a display;
  a first computer;
  a first memory configured to store a first computer program that is provided by a vendor of the communication apparatus,
wherein the first computer program, when executed by the first computer, causes the first terminal to:
  obtain a character string by decoding a code image in response to the first camera reading the code image, the character string being described in accordance with Bootstrapping Information Format and including a public key of the communication apparatus and specific information, the specific information being used for displaying an operation screen for the communication apparatus;
  execute a display process by using the specific information in the character string, the display process being for displaying the operation screen on the display, the operation screen indicating a changing operation for changing a state of the communication apparatus from a first state in which the wireless communication according to the DPP scheme is not to be executed to a second state in which the wireless communication according to the DPP scheme is to be executed; and
  execute a specific process after the character string is obtained, the specific process being for enabling a first target communication via the first wireless interface with the communication apparatus according to the DPP scheme, the first target communication being for enabling a pair of apparatuses to establish a wireless connection therebetween according to the DPP scheme, and the first target communication being executed using the public key included in the character string after the state of the communication apparatus is changed from the first state to the second state due to the changing operation, wherein the second terminal comprises:
  a second camera;
  a second wireless interface configured to execute the wireless communication according to the DPP scheme;
  a second computer; and
  a second memory configured not to store the first computer program but to store a second computer program, the second computer program being not provided by the vendor of the communication apparatus,
wherein the second computer program, when executed by the second computer, causes the second terminal to:
  obtain the character string by decoding the code image in response to the second camera reading the code image, the character string being described in accordance with Bootstrapping Information Format and including the public key of the communication apparatus and specific information, the specific information being used for displaying the operation screen for the communication apparatus; and
  execute, without executing the display process, the specific process after the character string is obtained, the specific process being for enabling a second target communication via the second wireless interface with the communication apparatus according to the DPP scheme, the second target communication being for enabling a pair of apparatuses to establish a wireless connection therebetween according to the DPP scheme, and the second target communication being executed using the public key included in the character string after the state of the communication apparatus is changed from the first state to the second state due to the changing operation.

2. The communication system according to claim 1,
wherein the character string includes:
  a first identifier according to Augmented Backus Naur Form (ABNF) rule;
  a first character string described in association with the first identifier and being the public key;
  a second identifier according to the ABNF rule; and
  a second character string described in association with the second identifier and being the specific information,
wherein the first computer program causes the second terminal to:
  specify the second character string as the specific information for displaying the operation screen, and
wherein the second computer program causes the first terminal to:
  not specify the second character string as the specific information for displaying the operation screen.

3. The communication system according to claim 1,
wherein the communication system further comprises a server, and
wherein the display process includes:
  receiving, from the server, web page data for displaying the operation screen; and
  displaying, on the display, the operation screen by using the received web page data.

4. The communication system according to claim 3,
wherein the display process includes transmitting a web page request in which a Uniform Resource Identifier (URI) including identification information of the communication apparatus is included as a transmission destination, and wherein the server comprises:
  a server memory configured to store one or more messages each of which indicates the changing operation for changing corresponding type of apparatus from the first state to the second state; and
  a server controller configured to:
    extract, from the server memory, a certain message from the one or more messages in response to receiving the web page request from the first terminal, the certain message corresponding to a type of device specified by the identification information in the URI; and
    transmit, to the first terminal, the web page data including the extracted certain message.

5. The communication system according to claim 1,
wherein the first memory of the first terminal further stores the second computer program, and
wherein the specific process includes providing the second computer program stored in the first memory with the character string for enabling the second computer program to execute the first target communication with the communication apparatus.

6. The communication apparatus according to claim 1,
wherein one apparatus of the pair of the apparatuses is the communication apparatus.

7. A non-transitory computer readable recording medium for storing a first computer program for a terminal,
wherein the terminal comprising:
  a camera;
  a wireless interface configured to execute a wireless communication according to Device Provisioning Protocol (DPP) scheme of Wi-Fi standard;
  a display; and
  a computer,
wherein the first computer program, when executed by the computer, causes the terminal to:
  obtain a character string by decoding a code image in response to the camera reading the code image, the character string being described in accordance with Bootstrapping Information Format and including a public key of a communication apparatus and specific information, the specific information being used for displaying an operation screen for the communication apparatus;
  execute a display process by using the specific information in the character string, the display process being for displaying the operation screen on the display, the operation screen indicating a changing operation for changing a state of the communication apparatus from a first state in which a wireless communication according to the DPP scheme is not to be executed to a second state in which the wireless communication according to the DPP scheme is to be executed; and
  execute a specific process after the character string is obtained, the specific process being for enabling a first target communication via the wireless interface with the communication apparatus according to the DPP scheme, the first target communication being for enabling a pair of apparatuses to establish a wireless connection therebetween according to the DPP scheme, and the first target communication being executed using the public key included in the character string after the state of the communication apparatus is changed from the first state to the second state due to the changing operation.

8. The non-transitory computer readable recording medium according to claim 7,
   wherein the character string includes:
      a first identifier according to Augmented Backus Naur Form (ABNF) rule;
      a first character string described in association with the first identifier and being the public key;
      a second identifier according to the ABNF rule; and
      a second character string described in association with the second identifier and being the specific information,
   wherein the first computer program causes the terminal to:
      specify the second character string as the specific information for displaying the operation screen.

9. The non-transitory computer readable recording medium according to claim 7,
   wherein the first computer program further causes the terminal to:
      specifying, in the obtained character string, a second character string;
      receiving, from a server, web page data by using the second character string;
      displaying, on the display, the operation screen by using the received web page data;
      specifying, in the obtained character string, a first character string corresponding to the public key; and
      enabling, by using the first character string, the first target communication with the communication apparatus according to the DPP scheme.

10. The non-transitory computer readable recording medium according to claim 7,
   wherein the display process includes:
      receiving, from a server, web page data for displaying the operation screen; and
      displaying, on the display, the operation screen by using the received web page data.

11. The non-transitory computer readable recording medium according to claim 10,
   wherein the specific information is a Uniform Resource Identifier (URI) indicating a location of the web page data in the server.

12. The non-transitory computer readable recording medium according to claim 10,
   wherein the specific information is identification information for identifying the communication apparatus, and
   wherein the display process includes generating a Uniform Resource Identifier (URI), the URI indicating a location of the web page data in the server and including the specific information.

13. The non-transitory computer readable recording medium according to claim 10,
   wherein the display process includes:
      receiving the web page data from the server without using a browser program of the terminal; and
      displaying the web page on the display without using the browser program.

14. The non-transitory computer readable recording medium according to claim 7,
   wherein the non-transitory computer readable recording medium configured to store a second computer program, the second computer program being not provided by a vendor of the communication apparatus, and
   wherein the specific process includes providing the second computer program with the character string for enabling the second computer program to execute the first target communication with the communication apparatus.

15. The non-transitory computer readable recording medium according to claim 7,
   wherein the first target communication includes:
      transmitting, to the communication apparatus, an authentication request according to the public key;
      receiving, from the communication apparatus, an authentication response that is a response to the authentication request; and
      transmitting, to the communication apparatus, connection information, and
   wherein the connection information is information for enabling the communication apparatus and an access point to establish the wireless connection therebetween according to the DPP scheme.

16. The non-transitory computer readable recording medium according to claim 7,
   wherein one apparatus of the pair of apparatuses is the communication apparatus.

17. A communication apparatus comprising:
   a wireless interface configured to execute a wireless communication according to Device Provisioning Protocol (DPP) scheme of Wi-Fi standard;
   a housing to which a seal is attached, the seal including a code image that is generated by encoding a character string, the character string being described in accordance with Bootstrapping Information Format and including a public key of the communication apparatus and specific information, the specific information being used for enabling a first terminal to execute a display process for displaying an operation screen of the communication apparatus, the display process being executed by a first computer program of the first terminal provided by a vender of the communication apparatus, the operation screen indicating a changing operation for changing a state of the communication apparatus from a first state in which a wireless communication according to the DPP scheme is not to be executed to a second state in which the wireless communication according to the DPP scheme is to be executed; and
   a controller configured to:
      receiving the changing operation for changing the state of the communication apparatus from the first state to the second state;
      in a case where the changing operation is received in response to displaying the operation screen at the first terminal, execute a first target communication via the wireless interface with the first terminal according to the DPP scheme in response to the first terminal using the public key included in the character string, the first target communication being for enabling a pair of apparatuses to establish a wireless connection therebetween according to the DPP scheme; and
      in a case where the changing operation is received without displaying the operation screen at a second terminal that stores a second computer program not provided by the vender, execute a second target communication via the wireless interface with the second terminal according to the DPP scheme in response to the second computer program using the public key included in the character string, the second target communication being for enabling a pair of apparatuses to establish a wireless connection therebetween according to the DPP scheme.

18. The communication apparatus according to claim 17, wherein the character string includes:
  a first identifier according to Augmented Backus Naur Form (ABNF) rule;
  a first character string described in association with the first identifier and being the public key;
  a second identifier according to the ABNF rule; and
  a second character string described in association with the second identifier and being the specific information,
wherein the first character in association with the first identifier is identified by the second computer program of the second terminal, and
wherein the second character in association with the second identifier is identified by the first computer program of the first terminal as the specific information for displaying the operation screen, and is not identified by the second computer program of the second terminal.

19. The communication apparatus according to claim 17, wherein the display process includes:
  receiving, from a server, web page data for displaying the operation screen; and
  displaying, on the first terminal, the operation screen by using the received web page data.

20. The communication apparatus according to claim 19, wherein the specific information is a Uniform Resource Identifier (URI) indicating a location of the web page data in the server.

21. The communication apparatus according to claim 19, wherein the specific information is identification information for identifying the communication apparatus, and wherein the display process includes generating a Uniform Resource Identifier (URI), the URI indicating a location of the web page data in the server and including a domain of the server and the identification information.

22. The communication apparatus according to claim 17, wherein the first target communication includes:
  receiving, from the first terminal, a first authentication request according to the public key;
  transmitting a first authentication response that is a response to the first authentication request; and
  receiving, from the first terminal, first connection information,
wherein the first connection information is information for enabling the communication apparatus and an access point to establish the wireless connection therebetween according to the DPP scheme,
wherein the second target communication includes:
  receiving, from the second terminal, a second authentication request according to the public key;
  transmitting a second authentication response that is a response to the second authentication request; and
  receiving, from the second terminal, second connection information,
wherein the second connection information is information for enabling the communication apparatus and the access point to establish the wireless connection therebetween according to the DPP scheme.

23. The communication apparatus according to claim 17, wherein one apparatus of the pair of the apparatuses is the communication apparatus.

* * * * *